C. F. BLAKE & J. H. BRIMSON.
TAP AND DRILL HOLDER.
APPLICATION FILED MAY 25, 1908.

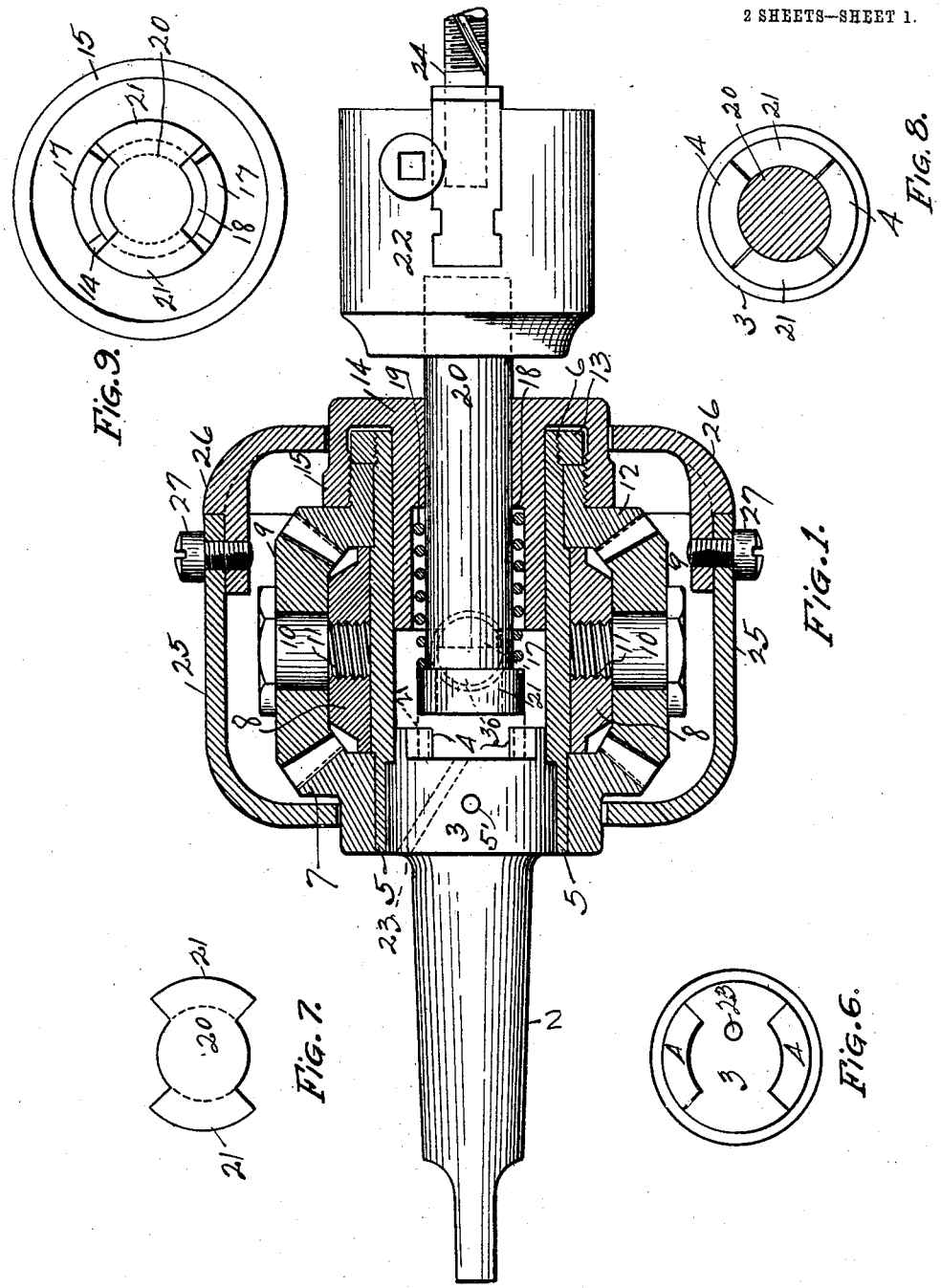

907,448.

Patented Dec. 22, 1908.

2 SHEETS—SHEET 2.

WITNESSES:
A. W. Heape
R. L. Wallace

INVENTORS:
Charles F. Blake.
James H. Brimson.

By Harry D. Wallace
ATTORNEY.

UNITED STATES PATENT OFFICE.

CHARLES F. BLAKE AND JAMES H. BRIMSON, OF WATERTOWN, NEW YORK.

TAP AND DRILL HOLDER.

No. 907,448.  Specification of Letters Patent.  Patented Dec. 22, 1908.

Application filed May 25, 1908. Serial No. 434,774.

*To all whom it may concern:*

Be it known that we, CHARLES F. BLAKE and JAMES H. BRIMSON, citizens of the United States, residing at Watertown, in the county of Jefferson and State of New York, have invented certain new and useful Improvements in Tap and Drill Holders, of which the following is a specification.

This invention relates to improvements in tap and drill holders designed for use in connection with boring machines, lathes and other mill machinery, and the invention relates particularly to a machine which is capable of tapping or drilling a hole and then automatically reversing itself for the purpose of withdrawing the tap or drill.

The object of the invention is to provide a simple, durable and rapid working tap holder which may be applied to a rotating spindle of a drill press or a boring machine and by means of which holes may be tapped or bored and the tap or drill withdrawn from the hole without requiring the stopping of the machine or changing or disconnecting any of its driving parts.

With these and other objects in view the invention consists in the novel construction and arrangement of the parts as set forth in the detail description which follows, illustrated by the accompanying drawings, and then particularly pointed out in the claims.

Figure 5:
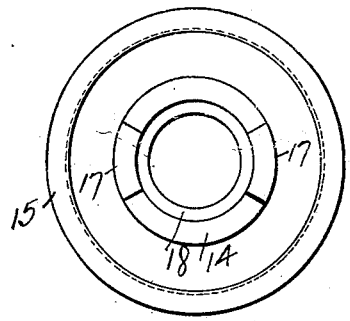
Figure 4:
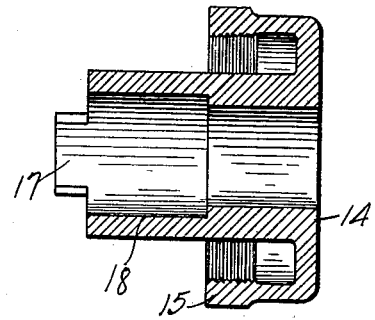
Figure 2:
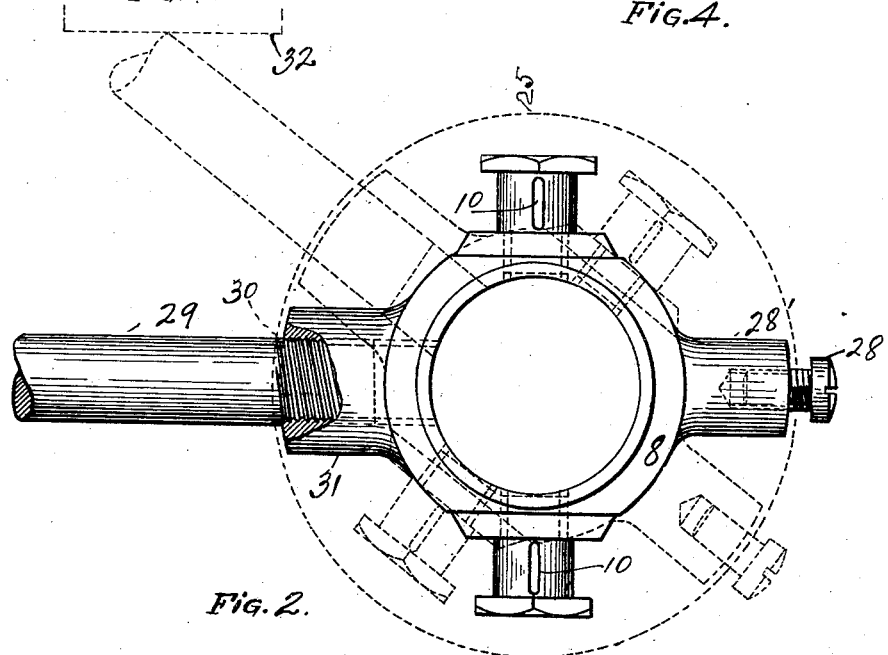
Figure 3:
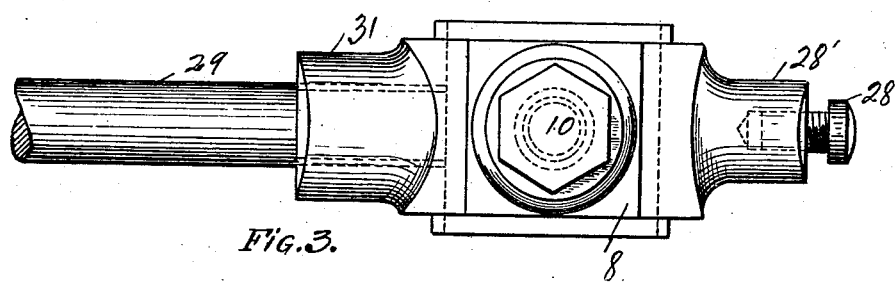

Referring to the accompanying drawings: Figure 1 is a central section through the tapping machine, showing the construction and arrangement of the principal parts of our invention. Figs. 2 and 3 are respectively an enlarged plan view and a side view of the gear and case holder, showing the manner of securing the case; also showing the application and use of the stop-arm. Figs. 4 and 5 are respectively a detail sectional view and a top plan of the clutch-sleeve nut, showing the disposition of the segmental clutch-lugs. Fig. 6 is a view of the inner end of the main spindle or shank, showing the location and form of the clutch-jaws. Fig. 7 is an end view of the chuck-spindle, showing the form and arrangement of the clutch-flanges which inter-lock with the clutch-jaws of the main spindle and also with the clutch-lugs of the clutch-sleeve. Fig. 8 is a view showing the inner end of chuck-spindle interlocked with the jaws on the inner end of main spindle, as when tapping or drilling is being done. Fig. 9 is a view showing inner end of chuck-spindle inter-locked with the lugs of the clutch-sleeve, for reversing and withdrawing the tap or drill.

Similar numerals of reference designate corresponding parts throughout the several figures.

In the drawings, 2 represents the main driving spindle, the outer end of which may be formed in any suitable manner for connecting the same with the driving parts of a boring machine or lathe. The inner end of the spindle 2 is enlarged, as at 3, and its inner face is provided with oppositely disposed integral clutch-jaws 4, the latter disposed near the outer edges of the face (see Figs. 1, 6 and 8).

5 represents a sleeve member of peculiar shape, the upper end of which is counterbored to receive the enlarged end 3 of the stock 2 to which it is rigidly connected. The lower end of sleeve 5 is externally threaded for a short distance at 6.

7 represents a miter-gear rigidly mounted upon the upper end of the sleeve 5 by a pin 5' which passes through stock 2 and sleeve 5. The sleeve 5 and the gear 7 are intended to be positively driven by the spindle 2.

8 represents a holder or body bored out centrally to fit and turn on the sleeve 5, when such action is desired, and this part is also capable of being held stationary while the sleeve 5 rotates within it. The holder 8 is employed principally for supporting oppositely disposed miter-gears 9 which at all times mesh with gear 7. The gears 9 are journaled on stud-bolts 10 which are threaded into the opposite sides of holder 8 at 11. When these bolts are driven in tightly the heads of the bolts hold the gears in operative position.

12 represents a fourth miter-gear which is journaled on the lower end of sleeve 5, and is held in mesh with the intermediate idler gears 9, by a nut or ring 13, which is attached to the lower end of the sleeve 5 by means of the threads 6.

Under this construction and arrangement the holder 8 is operatively confined between the gears 7 and 12, and the gear 12 in turn is held in place by the nut 13, and is intended to rotate freely on sleeve 5 when driven by the gears 9. Owing to the manner of connecting up the gears 7, 9 and 12, the latter gear is constantly driven the direction reverse to that of the gear 7, sleeve 5 and the spindle 2.

14 represents a sleeve-nut of peculiar form having an up-turned outer annular rim or portion 15, which is internally threaded for rigidly attaching the same to the threaded hub of gear 12, by means of which the clutch-sleeve 14 is positively driven. The central body of the sleeve 14 is formed to a diameter to operatively fit the bore of sleeve 5, its upper end is positioned at or near the middle of the sleeve 5, and spaced an inch or more from the inner end of the spindle 2.

17 represents oppositely arranged segmental clutch-lugs formed on the inner or upper end of sleeve 14 (see Figs. 1, 4, 5 and 9). These clutch-lugs are similar in form and about the size of the clutch-jaws 4 of the spindle 2. The sleeve 14 is counter-bored at 18 to receive a coil spring 19.

20 represents a chuck-spindle having a diameter to operatively fit the bore of the clutch body 14. The lower end of spindle 20 is slightly tapered to receive a tap or drill chuck 22. The upper end of the spindle 20 is preferably formed as shown in Figs. 1, 7 and 9, having two oppositely facing concentric flanges 21. The flanges 21 are formed exactly alike and constitute the male parts of a clutch for driving and reversing the tap or drill held by the chuck 22. The flanges 21 are substantially of the same form as the jaws 4 of the inner end of the spindle 2, and also the clutch-lugs 17 formed on the upper end of the sleeve 14. The flanges 21 are intended to inter-lock with the jaws 4, (see Fig. 8), for the purpose of driving the tap or drill into a hole, and after the hole is tapped or drilled, to be shifted and inter-locked with the clutch-lugs 17 (see Fig. 9) for the purpose of reversing the travel of the tap and withdrawing it from the hole. The spindle 20 when placed in operative position in the machine is inserted through the spring 19 which is disposed in the counter-bore 18 of sleeve-nut 14. The upper end of the spring bears against the underside of the clutch-flanges 21 of spindle 20, and the spring is formed to a length, and has sufficient strength to lift the spindle upwardly to effect the inter-locking of the clutch parts 4—21. As long as the device is employed for tapping or boring, and during the interval in which the tap is disengaged or idle the spring 19 is intended to normally hold the spindle 20 in engagement with the clutch-jaws 4 of the main spindle 2.

From the foregoing it will be apparent that when the device is tapping or boring a hole, running idle or standing still, the normal position of the upper end of chuck spindle 20 is in engagement or inter-locked with the jaws 4 of the shank 2. The chuck 22 may be of any of the forms in common use, and may be mounted on the lower tapered end of the spindle 20 in any suitable manner.

23 represents an oil hole or duct bored at an angle through the inner head 3 of the spindle 2, for supplying oil for lubricating the working parts of the machine.

24 represents a tap or drill which is held by the chuck 22.

25 and 26 represent respectively the upper and lower sections of a casing which are held together by a series of screws 27. The casing is disposed in a manner to inclose the principal working parts of the device, as shown in Figs. 1 and 2. The casing is mounted loosely on the device and is employed for shielding the working parts from dust and dirt and also the operator from being injured by contact with the gears and other working parts. The casing is attached to the central body or holder 8 by means of a screw 28 which passes through a perforation (not shown) in one side of the upper half of the case and is threaded into a hub 28' of the holder 8, and also by a stop-rod or arm 29, which passes through a perforation 30 in the opposite side of the case and is threaded into a projecting hub 31 of the holder 8. The stop-arm 29 is employed for holding the tapping machine in suitable position convenient to the work being operated upon. In practice the stop-rod 29 is allowed to swing around and engage some part of the boring machine or lathe, as 32, for the purpose of holding the device steady and at any desired angle to perform the work. Under this construction and arrangement of the machine the holder 8 and the casing or shell 25—26 are held stationary while the spindles, gears and other working parts are rotated or otherwise operated within the casing.

To operate our improved tapping or drilling machine, the spindle 2 is connected in suitable manner to the driving shaft or other revolving part of a boring machine which is generally provided with an operating or feeding lever (not shown). After the tapping machine is set and adjusted in operative position convenient to the work, the operator will feed the tap or drill into the hole by pressing downwardly on the feed lever, which pressure should be maintained until the hole is tapped or drilled the required depth. During the interval the machine is employed for tapping or drilling a hole the chuck-spindle 20 is held inter-locked with the clutch-jaws 4 of the shank 2, which is its normal position, as heretofore explained. When the tap or drill is driven into the work the required distance, which is generally predetermined, the operator should cease pressing on the feed-lever and immediately lift the lever slightly for the purpose of shifting the clutch-flanges 21 of the upper end of the chuck-spindle 20 out of engagement with the clutch-jaws 4, and into engagement with the clutch-lugs 17 of the sleeve 14; and the reversing and unscrewing of the tap or drill will instantly take place. The releasing of chuck spindle 20 from the clutch 4 and the throwing of the same into engagement with the clutch 17, may be effected in a ready manner without requiring the stopping of the machine by simply lifting upwardly on the feed lever, as described. The sleeve-nut 14 being connected with and driven by the miter-gear 12, both of these parts by reason of their connection with the gear 7 through the idler gears 9 are rotated at all times in the direction to withdraw or unscrew the tap. As soon as the tap or drill is withdrawn free from the hole, spring 19 lifts the chuck-spindle 20 out of engagement with the clutch-lugs 17 and again throws it into engagement with the clutch-jaws 4 of spindle 2 ready for another tapping operation. During the entire operation of tapping or drilling a hole and the subsequent withdrawing or unscrewing of the tap or drill, the working parts of the device are kept in constant motion, through the connection of the spindle 2 with the driving parts of the boring machine. The tapping machine herein shown and described is extremely simple, compact and strong, and by its employment tapping and drilling may be accomplished with greater rapidity and effectiveness than is done by the use of any other device known to us.

The construction and disposition of the central holder 8, the arrangement of the gears and related parts, and the simplicity and effectiveness of the driving and reversing clutch mechanism, constitute novel and desirable improvements in tapping machines of the class, which have not heretofore been shown or used.

Some changes or modifications may be made in the various parts of the device within the scope defined by the appended claims, and we therefore do not restrict ourselves to the precise construction and arrangement as herein shown and described.

Having thus described our invention what we claim as new and desire to secure by Letters Patent, is—

1. A tapping machine, comprising a main-spindle adapted to be connected to a lathe or boring machine and driven thereby, the said spindle having clutch-jaws formed integrally on its inner end, a sleeve-member rigidly secured to the inner end of said main-spindle, a central holder loosely mounted on said sleeve-member, a miter-gear mounted rigidly on said sleeve-member and operable with said member and said main-spindle, a pair of miter-gears journaled on said holder and driven by said first miter-gear, a fourth miter-gear journaled on said sleeve-member, a nut to hold said fourth gear in mesh with the gears carried by said holder, a clutch-sleeve rigidly connected to the hub of said fourth gear and having a central tubular body operatively disposed in the bore of said sleeve-member, a pair of integral clutch-lugs on the inner end of said clutch-sleeve facing the jaws on said main-spindle, a chuck-spindle operatively fitting said clutch-sleeve, the said chuck-spindle capable of rotary and reciprocal movements in said clutch-sleeve, the inner end of said spindle having a pair of oppositely arranged integral clutch-flanges, normally inter-locked with the jaws of the main-spindle for driving a tap into a hole, and capable of being shifted and inter-locked with said clutch-lugs for reversing and unscrewing the tap, and means for normally holding said chuck-spindle inter-locked with said clutch-jaws.

2. A tapping machine, comprising a main spindle having integral clutch-jaws formed on one end, the opposite end adapted to connect with a driven member of a boring machine, a sleeve-member rigidly secured to said main spindle, a central holder journaled on said sleeve-member, a drive-gear rigid on said sleeve-member, a pair of idler-gears journaled on said holder, a driven-gear journaled on said sleeve-member, a sleeve-nut rigidly connected to said driven-gear, the body of said sleeve-nut operatively fitting the bore of said sleeve-member, integral clutch-lugs formed on the inner end of said sleeve-nut corresponding to and facing the jaws on said main spindle, a chuck-spindle operatively fitting the bore of said sleeve-nut, the inner end of said chuck-spindle having oppositely disposed clutch-flanges normally interlocked with the jaws of said main spindle for driving a tap into a hole, and capable of being shifted and inter-locked with said clutch-lugs for reversing and withdrawing the tap from the hole, and a spring carried by said sleeve-nut adapted to normally hold said chuck-spindle in engagement with the clutch-jaws of said main spindle after the tap is withdrawn.

3. The combination with a main spindle having clutch jaws formed on its inner end, and a stationary holder, of a sleeve-member rigidly secured to said spindle and journaled in said holder, a miter-gear rigidly mounted on said sleeve-member adjacent one end of said holder, a miter-gear journaled on said sleeve-member adjacent the opposite end of said holder, a pair of idler-gears journaled on said holder and meshing with said miter gears, a clutch sleeve journaled in said sleeve-member and connected to the second miter-gear, said clutch sleeve having oppositely arranged clutch lugs formed on its inner end facing the jaws of said main spindle, a chuck-spindle operatively fitting said clutch sleeve, said chuck-spindle capable of rotary and reciprocal movements in said clutch sleeve, and a pair of oppositely facing clutch flanges formed on the inner end of said chuck-spindle, disposed in a manner to normally engage the jaws of said main spindle for driving a tap into a hole, and capable of being shifted axially and inter-locked with the lugs of said clutch sleeve, for the purpose of reversing and withdrawing the tap from the hole.

4. A tapping machine, comprising a main spindle having clutch-jaws formed on its inner end, a chuck-spindle having clutch-flanges adapted to inter-lock with said clutch-jaws, by means of which said chuck-spindle is directly and positively operated for tapping a hole, a sleeve-member connected to said main spindle, a normally stationary gear holder loosely mounted on said sleeve-member, a train of reversing gears comprising a drive-gear made rigid on said sleeve-member, a driven-gear journaled on said sleeve-member, two oppositely facing gears journaled on said holder and constantly in mesh with said drive and driven gears a clutch-sleeve operably fitted into said sleeve-member and counter-bored a portion of its length the said clutch sleeve adapted to coöperate with all of said gears for reversing and withdrawing a tap or drill, and a spring disposed in the counter-bore of said clutch-sleeve and surrounding said chuck-spindle adapted to lift and normally hold said chuck-spindle inter-locked with the jaws of said main spindle.

5. A tap and drill holder, comprising a main spindle having integral clutch-jaws formed on its inner end, a sleeve secured to the inner end of said main spindle, a normally stationary holder loosely mounted on said sleeve, a train of miter gears, one gear rigidly mounted on said sleeve, a second gear journaled on said sleeve, a third and a fourth gear journaled on the opposite sides of said holder a clutch-sleeve operatively fitting said sleeve connected with and driven by said second gear, clutch-lugs formed integrally on the upper end of said clutch-sleeve facing said clutch-jaws, a chuck-spindle operatively fitting said clutch-sleeve, having integral clutch-flanges formed on its upper end, the upper end of said chuck-spindle disposed in a manner to be alternately inter-locked with said jaws and with said lugs by the reciprocal movement of said chuck-spindle, for the purpose of driving a tap or drill into a hole and for releasing and withdrawing the tap or drill, and means for normally holding said chuck-spindle inter-locked with said clutch-jaws.

6. A tapping machine, comprising a main-spindle adapted to be driven by a boring machine or lathe, a chuck-spindle adapted to be directly driven in one direction by said main-spindle, a clutch mechanism, comprising integral clutch-jaws formed on one end of said main-spindle, and clutch-flanges formed integrally on one end of said chuck-spindle for operatively connecting said spindles, a sleeve-member connected to said main-spindle, a ring-shaped holder journaled on said sleeve-member, a series of miter-gears operatively connected to each other and driven by said main-spindle, two of said gears mounted on said sleeve-member, one being rigid, the other loose on said sleeve-member, and two of said gears journaled on said holder, a clutch-sleeve connected to and rotated by one of said miter-gears in a direction reverse to the travel of said main-spindle, the said clutch-sleeve forming a bearing for said chuck-spindle and having integral clutch-lugs formed on its inner end adapted to engage the clutch-flanges of said chuck-spindle for effecting the reversing of the travel of said spindle, a hollow two-part casing inclosing the working-parts of the machine, and a stop-arm to connect said casing to said holder and adapted to hold said parts stationary during tapping or drilling operations.

7. A tapping machine, comprising a main spindle adapted for connection to a rotary part of a boring machine, the said spindle having integral clutch-jaws formed on its inner end, a sleeve-member secured to said main spindle, one end having an external threaded portion, a miter-gear rigidly secured to said sleeve-member, a second miter-gear journaled on said sleeve-member and having a threaded hub, a nut mounted on the threaded portion of said sleeve-member to hold the second miter-gear in place, a central annular holder journaled on said sleeve-member between said miter-gears, a pair of idle-gears journaled on the opposite sides of said holder constantly in mesh with said miter-gears, the said idle-gears driven by the first miter-gear, and driving said second miter-gear in the direction opposite to the travel of said main spindle and said sleeve-member, a clutch-sleeve having an up-turned threaded rim connecting with the hub of said second miter-gear and operable therewith, the body of said clutch-sleeve operatively fitting in said sleeve-member, and counter-bored for a portion of its length, a pair of clutch-lugs formed integrally on one end of said clutch-sleeve, a chuck-spindle operatively fitting said clutch-sleeve, one end of said spindle having oppositely arranged clutch-flanges adapted to engage and inter-lock with the jaws on said main spindle for driving said spindle in the direction to tap a hole, and also adapted to be shifted endwise away from said jaws and inter-locked with said clutch-lugs for the purpose of releasing and unscrewing the tap, and a spring disposed in the clutch-sleeve adapted to lift said chuck-spindle and normally hold it in engagement with the jaws of the main spindle.

In testimony whereof we affix our signatures in presence of two witnesses.

CHARLES F. BLAKE.
JAMES H. BRIMSON.

Witnesses:
 DUAM ORMSBY,
 O. R. OWENS.